United States Patent [19]

Stone et al.

[11] Patent Number: 4,899,777
[45] Date of Patent: Feb. 13, 1990

[54] THERMALLY ACTIVATED PRESSURE RELIEF PLUG

[75] Inventors: Michael D. Stone, Springfield; Alan D. O'Neal, Willard, both of Mo.

[73] Assignee: Tuthill Corporation, Hinsdale, Ill.

[21] Appl. No.: 338,048

[22] Filed: Apr. 14, 1989

[51] Int. Cl.⁴ .............................................. F16K 17/40
[52] U.S. Cl. ...................................... 137/74; 137/72; 220/89 B
[58] Field of Search ................... 137/72, 74; 220/89 B; 415/47

[56] References Cited

U.S. PATENT DOCUMENTS

| | | | |
|---|---|---|---|
| 243,847 | 7/1881 | Burritt | 137/74 X |
| 937,713 | 10/1909 | Page | 137/74 X |
| 1,864,380 | 6/1932 | Tepas | 137/74 X |
| 2,493,644 | 1/1950 | Rider | 137/74 X |
| 3,206,061 | 9/1965 | Feldman | 220/89 B X |
| 3,618,627 | 11/1971 | Wagner | 137/72 X |
| 3,800,878 | 4/1974 | Poitras | 137/72 X |
| 3,927,791 | 12/1975 | Hershberger | 220/89 B |
| 4,221,231 | 9/1980 | Harvey et al. | 137/72 |
| 4,452,275 | 6/1984 | Sugimura | 137/74 X |

FOREIGN PATENT DOCUMENTS 782559 9/1957 United Kingdom .................. 137/74

Primary Examiner—John Rivell
Attorney, Agent, or Firm—Haverstock, Garrett & Roberts

[57] ABSTRACT

A temperature actuated relief plug assembly for mounting in a port in a pressurized structure to provide pressure relief when the temperature of the gases in the pressurized structure exceeds some predetermined temperature, the assembly including a metallic body having a portion for mounting in the port in the pressurized structure and a portion extending externally therefrom, the metallic body having a chamber therein and an opening communicating the chamber with the interior of the pressurized structure, and a temperature actuated structure closing the opening in the body and exposed to the temperature of the gases in the pressurized structure, the temperature actuated structure including a first member with a passage therethrough mounted in the opening and a second member soldered to the first member in position closing the passage therethrough by a solder material that has a predetermined melt temperature which will cause the second member to separate from the first member when the temperature of the gases in the pressurized structure equal or exceed the predetermined temperature.

18 Claims, 2 Drawing Sheets

THERMALLY ACTIVATED PRESSURE RELIEF PLUG

There are in existence numerous pressure relief plugs or valves of various constructions including devices that have rupturable and/or releasable diaphram type members which rupture or break when the pressure difference on opposite sides thereof reaches or exceeds some predetermined pressure differential. The fragment or fragments of such members or diaphrams are often projected from the housing in which they are installed, sometimes at dangerously high speeds and it is difficult to know precisely when the rupturing or breaking loose will occur and what will happen to the diaphram when it does. Another problem with known relief valves is that repeated exposure of the diaphrams to pressure differentials may weaken them thereby changing their characteristics and making it less predictable and less precise as to when they will rupture or blowout. In large part this is because most known relief devices are primarily pressure activated rather than temperature activated.

Typical known relief valve constructions are disclosed in the following listed U.S. Patents, to wit:

| | | |
|---|---|---|
| 1,734,186 | Weidmann et al | Nov. 5, 1929 |
| 2,115,371 | Mossberg | Apr. 26, 1938 |
| 2,828,759 | Gerhart, Jr. | Apr. 1, 1958 |
| 2,859,758 | Jurs | Nov. 11, 1958 |
| 4,334,549 | Burch et al | Jun. 15, 1982 |
| 4,365,643 | Masclet et al | Dec. 28, 1982 |

The present relief plug device differs from the prior art constructions because it is primarily thermally rather than pressure activated, and therefore is more reliable and predictable in its operation and can be made to be stronger and less susceptible to pressure differences thereacross. The present device is also relatively little effected by repeated use and repeated exposure to pressure differentials, is not likely to rupture or fragmentate, is not able to be jettisoned from the device on which it is installed, and when it does blow the present device traps and retains the diaphram. The present device is also relatively simple structurally and is easy to manufacture, install and replace. The present relief plug therefore represents and important improvement in relief valves or plugs and especially as to those pressure relief devices that are exposed to high pressures such as those in the output of a device such as a blower device.

THE PRESENT INVENTION

The present invention resides in a thermally activated relief plug for installing in the outlet portion of a housing such as a blower housing, and it comprises a plug housing open at both ends, one of the end openings usually being larger than the other, and with a portion adjacent to the one end of the housing for threading it into a threaded bore in a blower or like housing. The device further includes an annular metallic flanged member mounted in the larger diameter end opening of the housing preferably with a layer of a thermally insulating material located between the flanged member and the housing opening, and a disk member attached to and closing the opening through the annular flanged member, said disk member being attached to the flanged member by a solder material that has a predictable melting point that corresponds to the maximum temperature permissible in the discharge gas of the blower so that if the temperature of the gas in the outlet of the blower reaches or exceeds the melting point of the solder the solder will melt sufficiently to allow the disk to separate from the flanged member and move in the plug housing by the force of the escaping gas to a position adjacent to the smaller diameter housing end opening. In this way the pressure inside the blower will be relieved and reduced to some lesser amount, no parts will be lost or ruptured in the process, and when desired the relief plug can be removed and replaced and, if desired, the same or a different flanged member with a disk attached thereto can be installed. The fact that the disk can not escape from the relief plug housing when it blows and can be made strong enough to be relatively unaffected by repeated exposure to pressure differences thereacross are important safety and operational features of the present construction. The selection of a suitable solder material for attaching the disk to the flanged member can also be used to control the temperature at which the plug will blow.

OBJECTS OF THE INVENTION

A principal object of the present invention is to provide a relatively inexpensive yet accurate and reliable safety relief plug for use on blowers and like devices.

Another object is to provide means to reduce the possibility of damaging a blower due to operating at excessively high temperatures and pressures.

Another object is to provide a relief plug that is safer to use than known devices used for the same purposes.

Another object is to make it possible to more accurately control and predict when a pressure relief plug will blow.

Another object is to make the operation of a relief plug installed in a blower housing primarily responsive for its activation to the temperature of the gases in the outlet of a blower and relatively insensitive to the temperature of the blower housing on which it is installed.

Another object is to provide a pressure relief plug that is relatively unaffected by the pressure in the device on which it is installed.

Another object is to provide a relief plug that is relatively easy to make, to install, to remove and replace the parts thereof.

Another object is to provide a relief plug for a blower which when activated will permit the blower to continue to operate but at reduced output.

Another object is to enable continued uninterrupted operation of a blower even after the blower is subjected to an overheated condition.

Another object is to teach the constructions of a relief plug construction that can be repaired relatively quickly and easily.

These and other objects and advantages of the present relief plug construction will become apparent to those skilled in the art after considering the following detailed description of preferred embodiments in conjunction with the accompanying drawings.

DETAILED DESCRIPTION OF THE PREFERRED EMBODIMENTS

Figure 1:
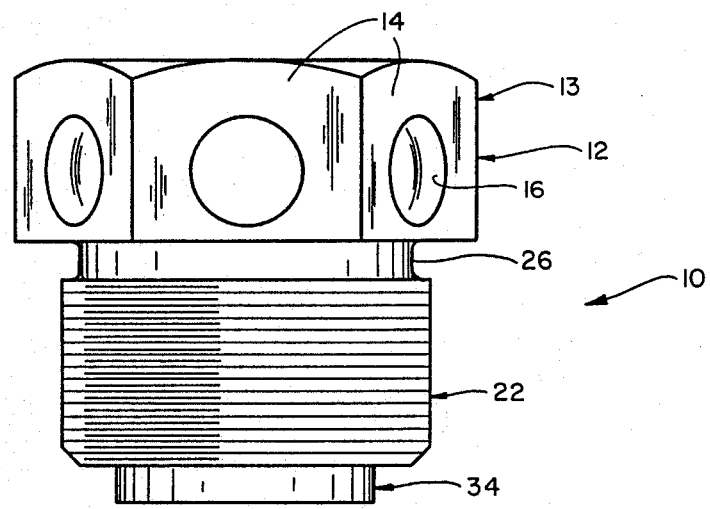
FIG. 1 is a side elevational view of a relief plug constructed according to the present invention.
Figure 3:
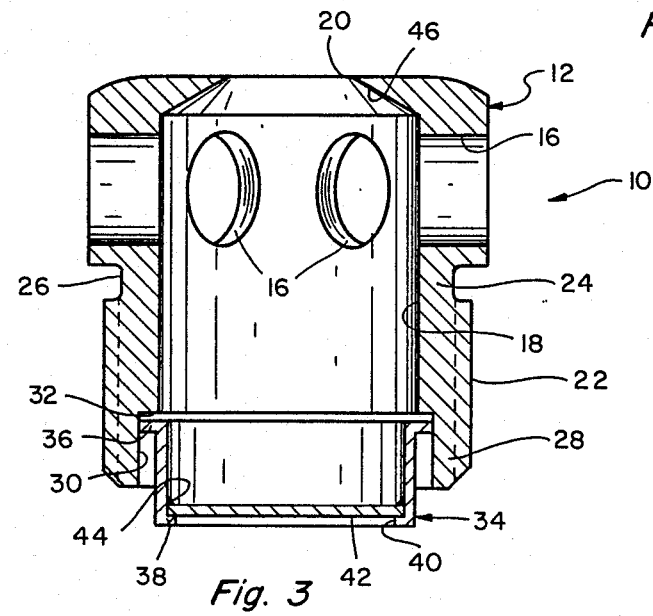
FIG. 3 is a cross-sectional view taken on line 3—3 of FIG. 2.

Referring to the drawings more particularly by reference numbers, number 10 in FIGS. 1 and 3 refers to a temperature activated pressure relief plug constructed according to the present invention. The plug 10 includes a body 12 with a head end portion 13 shown of hexagonal shape having six side faces 14 each shown having an opening 16 thereinto. The openings 16 communicate with a central chamber or bore 18 which extends most of the way through the plug body. One end portion 13 of the body bore 18 (the upper end as shown) communicates with an end opening 20. The head end portion 13 of the body 12 is connected by a narrow integral body portion 24 within external body groove 26 to a threaded body portion 22. The lower end portion 28 of the body 12 has a counterbore 30 extending therein from the free end and is in communication with the chamber 18. The counterbore 30 terminates at shoulder 32.

An annular metallic flanged member 34 having an outwardly extending annular flange portion 36 at one end and an inwardly extending annular flange portion 38 at the opposite end is positioned in the counter bore 30 and is held in position therein by engagement between the outer edge of the flange 36 and the surface of the counterbore 30. Other means may also be provided as will be explained to hold the member 34 in position. The inwardly extending annular flange 38 at the opposite end of the flanged member 34 forms a shelf or bottom wall and defines an opening 40 therethrough.

A round disk 42 of a material such as brass or the like is sized to be positioned in and against the inwardly extending flange 38 as shown in FIG. 3. The edge and adjacent surface portions of the disk 42 are soldered to the flanged member 34 by means of an annular ring of solder 44 that extends between the adjacent surfaces of the members. A typical solder that has been tested and used for this purpose in indium solder which has a consistant reliable relatively low melt temperature that in one application is chosen to be at or close to 312° F. At this temperature or within a narrow range thereof of about 1° F. this solder goes from its solid to a liquid phase making it a highly accurate means to control the temperature at which the disk member 42 is freed from the flanged member 34. Other solders can also be used for the same purpose but they will have their own distinct melt temperatures and will be selected based on the desired melt temperature. One such other solder that has been tested and used is a solder that includes about 37% lead and about 63% tin, sometimes referred to as an eutectic solder. This solder goes from its solid to its liquid state at a temperature at or about 360° F. Eutectic solders of this type are good for use in the subject device because they provide a fairly consistant melt temperature for activating of the plug, and the selection of such eutectic materials in the solder can be made to produce almost any desired activating temperature over a fairly wide range. There are many such solders and solder compositions that can be used, the selection of which will depend upon the temperature at which it is desired to melt the solder.

The actual solder connection between the disk and the flanged member can be accomplished in a usual manner, that is by applying flux to the cleaned adjacent surfaces of the members to be connected, holding the members together, and applying solder so that it flows into the space between the members to complete the solder connection therebetween.

It is important to the present invention that the solder selected to attach the disk 42 to the member 34 melt or soften at some predetermined desired temperature so that when it melts or softens the pressure inside of the structure on which the subject plug 10 is installed will cause the disk member to move outwardly in the chamber 18 to a position adjacent to the chamber end wall 46 which surrounds the opening 20. The wall 46 against which the disk moves can be tapered as shown in FIG. 3 or it can be formed with a flat annular shoulder without changing the nature of the invention. It is important, however, that when the disk 42 breaks loose from the member 34 that it be free to move rapidly outwardly beyond the openings 16 so that the interior of the structure on which the plug is installed will be exposed to atmosphere through the openings 16, the size and number of which can be varied to partially relieve the pressure in the structure.

When the disk member 42 is loose and free to move outwardly to the position described, it will not be able to pass through the opening 20 and fly out of the chamber 18. This means that the disk 42 will not be able to become a projectile and escape or fly out of the device and present a danger or cause damage or be lost. In like manner, the disk 42 cannot fall through the opening 40 due to the flange 38, preventing any risk of damage to the equipment being protected by the proposed plug. This is an important safety feature of the subject construction. It is also important to note that the disk 42 can be made to be as strong gas desired to that it will not be adversely affected or weakened by the pressure differentials to which it is exposed which otherwise might cause it to bulge and/or weaken or break loose and become a projectile. This means that the temperature of the gas to which the solder 44 is exposed is the main thing that controls when the disk 42 will come loose. The flanged member 34 and the disk 42 can also be constructed to extend beyond the end of the plug body 12 into the structure on which the device is installed so that the solder 44 will be positioned further from the body 12.

It is also important to the present construction that the flanged member 34 preferably make minimal or no contact at all with the body 12 of the plug. This is done so that the solder 44 will be relatively little, if any, affected by the temperature of the body 12 and will be primarily only affected by the temperature of the gases inside of the structure being protected.

Figure 4:
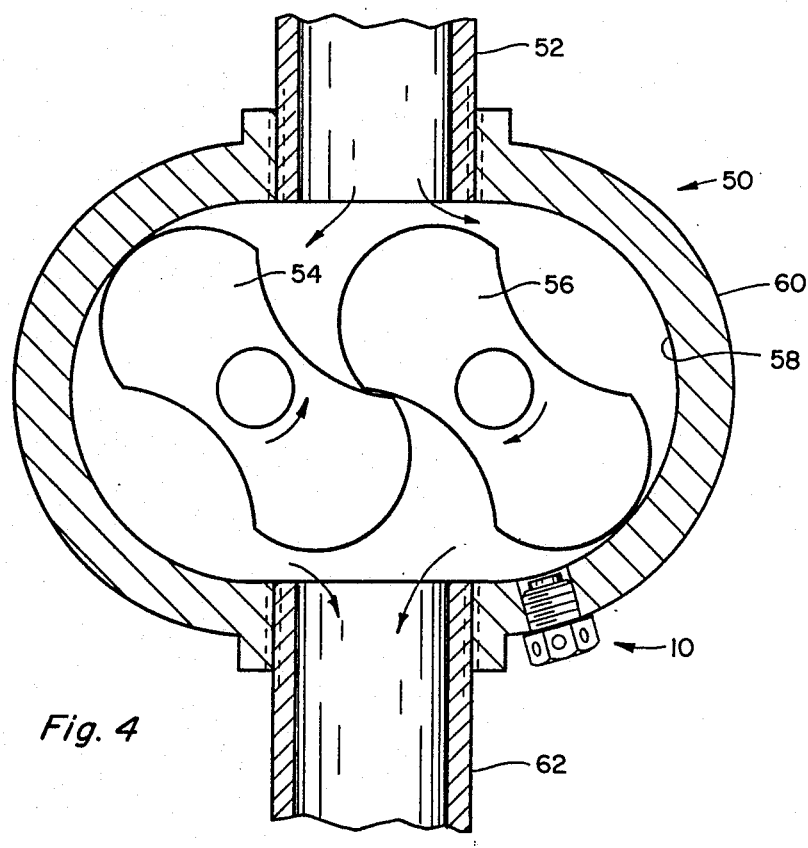
FIG. 4 is a simplified cross-sectional view of a blower device with the subject relief plug installed thereon.

FIG. 4 shows a blower device 50 having an inlet structure 52, cooperatively engageable rotatable blower members 54 and 56 rotatably mounted in blower chamber 58 of blower housing 60, and a blower outlet structure 62. The thermal relief plug 10 is shown mounted in an opening in the blower housing 60 on the outlet or downstream side of the rotatable members 54 and 56 in position to be exposed to the pressures and temperatures produced at the outlet side of the blower. The outlet side of the blower is the location in the blower that tends to heat up during operation, and it is the heat, not the pressure, that is used to activate the present relief plug 10 to relieve the blower and prevent it from overheating and being damaged while at the same time maintaining the blower in operation but at reduced pressure.

Figure 5:
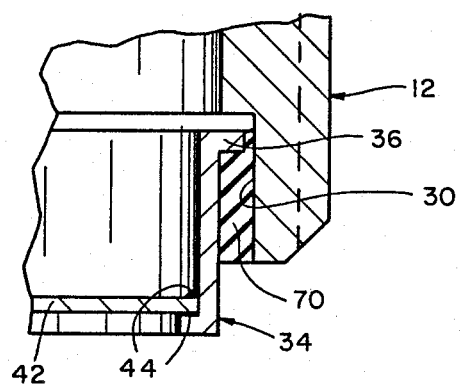
FIG. 5 is an enlarged fragmentary cross-sectional view showing the details of the construction of one form of the subject relief plug.

FIG. 5 is an enlarged view of another embodiment of the subject relief plug showing another way of mounting the flanged member 34 in the counterbore 30 of the body portion 12 of the plug. In this embodiment the diameter of the outwardly extending flange 36 of the flanged member 34 is made to be somewhat smaller than the diameter of the counterbore 30, and an annular ring 70 of thermal insulating material is positioned in the space between the member 34 and the counterbore 30 to thermally insulate the member 34 from the housing. This also thermally insulates the solder 44 from the housing and makes the solder less sensitive to the heat generated in the plug body 12.

Figure 2:
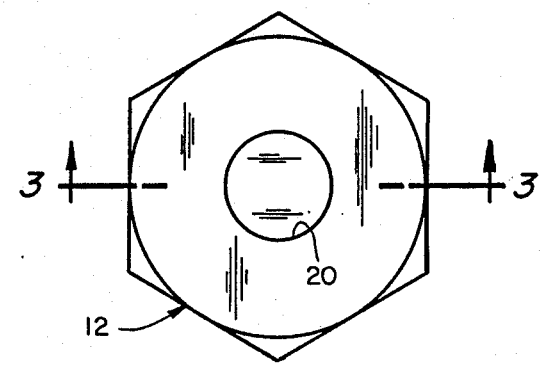
FIG. 2 is a top view of the plug of FIG. 1.
Figure 6:
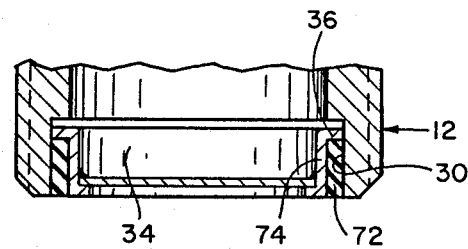
FIG. 6 is a fragmentary cross-sectional view showing another construction of the subject relief plug.

FIG. 6 shows the details of another embodiment of the subject plug constructed so that the flange member 34 does not extend beyond the end of the plug body 12 as in the other constructions described above. This construction also has a ring 72 of thermal insulating material positioned between the annular flange member 74 and the counter bore 30 but the outwardly extending flange 36 may in this construction engage the counterbore 30 to provide additional support for the member 74. Except for the differences noted, the constructions shown in FIGS. 5 and 6 are similar to and operate similar to the construction shown in FIGS. 1–3.

Thus there has been shown and described several preferred embodiments of a thermally activated relief plug which fulfill all of the objects and advantages sought therefor. It will be apparent to those skilled in the art, however, that many changes, modifications, variations and other uses and applications of the subject device are possible and contemplated. All such changes, modifications, variations and other uses and applications which do not depart from the spirit and scope of the invention are deemed to be covered by the invention which is limited only by the claims which follow.

We claim:

1. A temperature activated relief plug assembly for mounting in a port on a pressurized structure comprising
an assembly housing having a chamber formed therein, means on the housing for mounting the assembly on the pressurized structure in position extending between the interior of the pressurized structure and atmosphere, a first opening in the housing between the chamber and atmosphere and a second opening in the housing between the chamber and the inside of the pressurized structure;
means mounted in the second housing opening preventing communication between the chamber and the inside of the pressurized structure, said means including a flanged member having an endless sidewall, an outwardly extending wall formed on one end of said flanged member for movement into position in the second housing opening, and an inwardly extending wall forming a ledge at the opposite end of the flanged member, means closing the second housing opening including a disk member engageable with the inwardly extending wall, and means for removably attaching the disk member to the inwardly extending wall including attachment means which go from a solid to a liquid phase whenever a predetermined temperature occurs in the pressurized structure thereby enabling disengagement of the disk member from the flanged member.

2. The temperature activated relief plug assembly of claim 1 wherein the means attaching the disk member to the flanged member includes a solder material.

3. The temperature activated relief plug assembly of claim 1 wherein the second opening the housing includes a counterbore, the outwardly extending wall on the flanged member being sized to be received in the counterbore.

4. The temperature activated relief plug assembly of claim 1 wherein the housing has a hexagonal shaped portion located externally of the pressurized structure, the first opening extending through the hexagonal shaped portion communicating the housing chamber to atmosphere.

5. The temperature activated relief plug assembly of claim 4 wherein the hexagonal shaped portion of the housing has at least one transversely extending opening therethrough communicating the housing chamber to atmosphere.

6. The temperature activated relief plug assembly of claim 1 wherein the means for mounting the assembly housing on the pressurized structure includes threads in said port and a threaded housing portion on the assembly housing.

7. The temperature activated relief plug assembly of claim 1 including a layer of thermal insulating material positioned between the endless side wall of the flange member and the second housing opening.

8. A relief plug for mounting in the wall of an internally pressurized structure comprising
a tubular metallic body having a chamber therein and an opening in at least one end of the body in communication with the chamber,
means for mounting the body on a pressurized structure with the body opening adjacent to and exposed to the inside of pressurized structure,
means closing the body opening including an annular metallic support member having first and second annular end flanges and with an opening therethrough positioned in the body opening, a metal disk member positioned closing the opening through the support member, and means including a solder substance having a predetermined melt temperature releasably attaching the disk member to the support member closing the body opening, the metallic support member being positioned in the body opening in position such that the disk member and the solder substance are exposed directly to the environment inside the pressurized structure whereby release of the disk member from the support member occurs when the temperature in the pressurized structure reaches the melt temperature of the solder substance.

9. The relief plug of claim 8 including a second opening through the metallic body at a spaced location from the aforesaid opening communicating the chamber to atmosphere.

10. The relief plug of claim 8 wherein the pressurized structure is a blower.

11. The relief plug of claim 8 wherein the metallic support member extends beyond the opening in the tubular metallic body into a pressurized structure on which the plug is mounted.

12. The relief plug of claim 8 wherein the tubular metallic body has an external threaded portion adjacent to one end and a hexagonal portion adjacent to the opposite end.

13. The relief plug of claim 8 wherein the solder substance is indium solder.

14. The relief plug of claim 8 wherein the solder substance is a mixture of lead and tin.

15. A temperature actuatable relief plug assembly for mounting in a port in a pressurized structure to provide pressure relief for the structure when the temperature of the gases in the pressurized structure exceeds some predetermined temperature, the assembly including a metallic body having a portion for mounting in the port in the pressurized structure and a portion extending externally therefrom, the metallic body having a chamber therein and an opening communicating the chamber with the interior of the pressurized structure, a temperature actuated structure closing the opening in the body and exposed to the temperature of the gases in the pressurized structure, the temperature actuated structure including an annular member having an outwardly extending flange at one end, an inwardly extending flange at the other end, and an opening therethrough defined by the inwardly extending flange, a disk member having an edge portion in abutment with the inwardly extending flange, a solder substance meltable at the predetermined temperature releasably soldering the disk member to the inwardly extending flange and, exposed to the environment in the pressurized structure so that the disk member will be released from the annular member when the temperature in the pressurized structure reaches the melt temperature of the solder substance.

16. A relief plug for mounting in the wall of a pressurized structure comprising
    a tubular metallic body having a chamber therein and an opening in at least one end of the body in communication with the chamber,
    means for mounting the body on a pressurized structure with the body opening exposed to the inside of the pressurized structure,
    means closing the body opening including a metallic support member having an outwardly extending annular flange at one end, an inwardly extending annular flange at the opposite end, with an opening therethrough positioned in the body opening, a metal disk member positioned closing the opening through the support member, the metallic disk member having a peripheral portion in surface to surface contact with the inwardly extending annular flange, and means including a solder substance having a predetermined melt temperature positioned between the disk member and the support member for soldering the members together closing the body opening.

17. A relief plug for mounting in the wall of a pressurized structure comprising
    a tubular metallic body having a chamber therein and an opening in at least one end of the body in communication with the chamber,
    means for mounting the body on a pressurized structure with the body opening exposed to the inside of the pressurized structure,
    means closing the body opening including a metallic support member with an opening therethrough positioned in the body opening, a metal disk member positioned closing the opening through the support member, means including a solder substance having a predetermined melt temperature positioned between the disk member and the support member for soldering the members together closing the body opening, and a layer of thermal insulating material positioned between the metallic support member and the tubular metallic body.

18. A relief plug for mounting in the wall of a pressurized structure comprising
    a tubular metallic body having a chamber therein, an opening in at least one end of the body in communication with the chamber, and a cylindrical counterbore located in the opening extending into the body opening from one thereof,
    means for mounting the body on a pressurized structure with the body opening exposed to the inside of the pressurized structure,
    means closing the body opening including a metallic support member with an opening therethrough positioned in the cylindrical counterbore, a metal disk member positioned closing the opening through the support member, and means including a solder substance having a predetermined melt temperature positioned between the disk member and the support member for soldering the members together closing the body opening.

* * * * *

UNITED STATES PATENT OFFICE
CERTIFICATE OF CORRECTION

Patent No. 4,899,777                    Dated February 13, 1990

Inventor(s) Michael D. Stone and Alan D. O'Neal

It is certified that error appears in the above-identified patent and that said Letters Patent is hereby corrected as shown below:

Column 4, line 37, "gas" should be --as--.

Column 4, line 37, the second occurrence of "to" should be --so--.

Column 6, line 7, after "opening" insert --in--.

Signed and Sealed this

Eleventh Day of December, 1990

Attest:

HARRY F. MANBECK, JR.

*Attesting Officer*     *Commissioner of Patents and Trademarks*